US011420888B2

United States Patent
Wang et al.

(10) Patent No.: US 11,420,888 B2
(45) Date of Patent: Aug. 23, 2022

(54) TREATMENT PROCESS AND DEVICE FOR SUBMERGED LIFTING CIRCULATION TYPE BIO-MEMBRANE FILTER

(71) Applicants: HUNAN SCIENTOP AUTOMATIC EQUIPMENT SHARES CO. LTD, Changsha (CN); HUNAN SAKAL ENVIRONMENTAL SCIENCE AND TECHNOLOGY CO., LTD., Changsha (CN); Shen Wang, Changsha (CN)

(72) Inventors: Shen Wang, Changsha (CN); Yunliang Liu, Changsha (CN)

(73) Assignees: HUNAN SCIENTOP AUTOMATIC EQUIPMENT SHARES CO. LTD, Changsha (CN); HUNAN SHAKAL ENVIRON. SCI AND TECH CO., LTD., Changsha (CN); Shen Wang, Changsha (CN)

( * ) Notice: Subject to any disclaimer, the term of this patent is extended or adjusted under 35 U.S.C. 154(b) by 36 days.

(21) Appl. No.: 16/993,248

(22) Filed: Aug. 13, 2020

(65) Prior Publication Data

US 2020/0369543 A1     Nov. 26, 2020

Related U.S. Application Data

(63) Continuation of application No. PCT/CN2018/087979, filed on May 23, 2018.

(30) Foreign Application Priority Data

May 22, 2018  (CN) .......................... 201810492033.0

(51) Int. Cl.
  *C02F 3/08*    (2006.01)
  *C02F 3/06*    (2006.01)
  *C02F 101/30*  (2006.01)

(52) U.S. Cl.
  CPC .................. *C02F 3/08* (2013.01); *C02F 3/06* (2013.01); *C02F 2101/30* (2013.01);
  (Continued)

(58) Field of Classification Search
  CPC ........ C02F 3/082; C02F 3/06; C02F 2101/30; C02F 3/08
  (Continued)

(56) References Cited

U.S. PATENT DOCUMENTS 4,177,147 A * 12/1979 Roberts ................... C02F 3/082
                                                      210/151
10,407,332 B2   9/2019 Prior et al.
(Continued)

FOREIGN PATENT DOCUMENTS

CN         201427889 Y      3/2010
CN         206051809 U      3/2017
(Continued)

OTHER PUBLICATIONS

Internation Search Report of PCT/CN2018/087979, dated Feb. 11, 2019.

*Primary Examiner* — Claire A Norris

(57) ABSTRACT

The present invention discloses a treatment process for a submerged lifting circulation type bio-membrane filter, wherein the treatment process comprises the following steps: two groups of symmetrically staggered filter curtains (2A and 2B) are adopted; the two groups of filter curtains (2A and 2B) are periodically lifted up and down in a reciprocating manner in a biofilter (1) under the action of a lifting mechanism (4), so that bio-membranes on the two groups of filter curtains (2A and 2B) are in contact with the atmosphere and sewage in turns, absorb organic matters in the sewage when lifting down for submerging, absorb oxygen when lifting up and exposing into to the atmosphere, and (Continued)

bring oxygen into the sewage and cause sewage turbulence in a water tank when lifting down for submerging again, so that the dissolved oxygen is uniformly distributed, thereby purifying the sewage.

9 Claims, 13 Drawing Sheets

(52) U.S. Cl.
CPC .. *C02F 2203/006* (2013.01); *C02F 2209/225* (2013.01); *C02F 2303/02* (2013.01); *C02F 2303/06* (2013.01)

(58) Field of Classification Search
USPC .................................................. 210/150, 615
See application file for complete search history.

(56) References Cited

U.S. PATENT DOCUMENTS

2006/0131230 A1 6/2006 Shao et al.
2008/0277340 A1 11/2008 Hong et al.

FOREIGN PATENT DOCUMENTS

| CN | 107055746 A | 8/2017 |
| CN | 206767746 U | 12/2017 |
| FR | 2579973 A1 | 10/1986 |

\* cited by examiner

TREATMENT PROCESS AND DEVICE FOR SUBMERGED LIFTING CIRCULATION TYPE BIO-MEMBRANE FILTER

CROSS-REFERENCE TO RELATED APPLICATIONS

This application is a continuation of International Patent Application No. PCT/CN2018/087979 with a filing date of May 23, 2018, designating the United States, now pending, and further claims priority to Chinese Patent Application No. 201810492033.0 with a filing date of May 22, 2018. The content of the aforementioned applications, including any intervening amendments thereto, are incorporated herein by reference.

TECHNICAL FIELD

The present invention belongs to the technical field of sewage treatment based on environmental protection, and particularly relates to a treatment process and a device for a submerged lifting circulation type bio-membrane filter.

BACKGROUND OF THE PRESENT INVENTION

The existing rotating biological contactors (RBCs), as fixed bio-membrane treatment equipment, have the following apparent shortcomings:

1. The shaft length is limited; and the costs of a long shaft are high.

The costs of processing the long shaft are high; and the strength of the long shaft is limited. Therefore, the shaft length of most RBCs is less than 8 in; and the shaft length limits the number of blades that can be mounted on the RBCs, thereby seriously affecting the manufacturing costs of the RBCs while limiting the treatment capacity of the RBCs.

2. The diameter of a disk is limited.

Theoretically, the larger the specific surface area of the disk, the better, so the larger the diameter of the disk, the better, but the diameter is limited by the strength of the disk. The disk is easy to flex and deform to lose efficacy due to insufficient strength. Therefore, the diameter of the disk is usually less than 6 m, which limits the treatment capacity of the RBCs and also seriously affects the manufacturing costs of the RBCs.

3. The manufacturing costs of semi-circular contact reaction tanks are high.

In order to avoid leaving dead corners in the contact reaction tanks, the interiors of the contact reaction tanks should be of a semi-circular or trapezoidal shape basically consistent with the shape of the disk. However, the manufacturing costs of semi-circular or trapezoidal bottoms are relatively high, which also leads to the high price of the RBCs and affects the promotion of the RBCs.

The RBCs are high in cost and low in treatment efficiency due to water inflowing and outflowing manners of the contact reaction tank. Water inflowing and outflowing directions are limited by the turning of the RBCs; a diversion pipeline for turning influent water from each level into effluent water of the next level is complex in structure; and the submerged area of the disk is gradually reduced, thereby gradually declining the treatment capacity of the RBCs.

SUMMARY OF PRESENT INVENTION

A purpose of the present invention is to provide a treatment process and a device for a submerged lifting circulation type bio-membrane filter, which solves the problems of complex structure, high manufacturing difficulty, high manufacturing cost, severely limited structure and the like of RBCs.

A technical solution adopted by the present invention is as follows:

The treatment process for the submerged lifting circulation type bio-membrane filter comprises the following steps: two groups of symmetrically staggered filter curtains with equal weight are adopted; the two groups of filter curtains are periodically lifted up and down in a reciprocating manner in a biofilter under the action of a lifting mechanism, so that bio-membranes on the two groups of filter curtains are in contact with the atmosphere and sewage in turns, absorb organic matters in the sewage when lifting down for submerging, absorb oxygen when lifting up and exposing into the atmosphere, and bring oxygen into the sewage and cause sewage turbulence in a water tank when lifting down for submerging again, so that the dissolved oxygen is uniformly distributed, thereby purifying the sewage.

In the above technical solution, in the lifting process of the filter curtains, an upper end face of a lower part of a frame of one filter curtain should be lower than the liquid level in the contact reaction tank of the biofilter when the filter curtain is lifted up to the highest position; and a lower end face of an upper part of the frame of one filter curtain should be higher than the liquid level in the contact reaction tank of the biofilter when the filter curtain is lifted down to the lowest position, so as to avoid excessive impact and disturbance caused by a liquid surface on each filter curtain.

In the above technical solution, a thermal insulation shed is arranged outside the bio-membrane filter, wherein a closed space is formed in the thermal insulation shed to separate the whole bio-membrane filter from the outside; an induced draft fan is arranged outside the thermal insulation shed; a blast pipeline of the induced draft fan is communicated with the interior of the thermal insulation shed; and an exhaust pipeline of the induced draft fan is connected with deodorization equipment. The thermal insulation shed isolates odor pollution while realizing thermal insulation, and controls the oxygen supply by controlling the air volume of the induced draft fan.

The device for the submerged lifting circulation bio-membrane filter comprises a biofilter, a bearing frame, two groups of filter curtains with equal weight, a lifting mechanism, a pulley block and two groups of anti-swing guide rails, wherein the lifting mechanism is mounted at a middle position above a crossbeam of the bearing frame; the bearing frame crosses over the biofilter and is fixed on the ground or a biofilter body; the pulley block is suspended on the crossbeam of the bearing frame; the lifting mechanism is connected with the two groups of filter curtains and drives the two groups of filter curtains by the driving mechanism in such a manner that a pull rope assembly passes through the pulley block; and the two groups of anti-swing guide rails are respectively arranged at positions corresponding to the two ends of hanging beams of the two groups of filter curtains.

In the above technical solution, the biofilter is of a rectangular structure and is located on or below the ground, wherein the filter is divided into a plurality of contact reaction tanks by a plurality of partition plates parallel to the bearing frame; the liquid levels of the contact reaction tanks are lowered gradually; a water inlet tank and a water outlet tank of each contact reaction tank are respectively arranged on both sides of the biofilter and are perpendicular to the bearing frame; and the water outlet tank of the previous contact reaction tank is located on the same side as the water inlet tank of the next contact reaction tank and is communicated with each other, and so on. The partition plate between each contact reaction tank and each of the water inlet tank and the water outlet tank is serrated; and a sludge discharge pipe is arranged at the lowest position at the bottom of each of the water inlet tank and the water outlet tank.

In the above technical solution, the bearing frame is used for mounting the lifting mechanism and the pulley block, crosses over the biofilter, coincides with a center-of-gravity plane of the filter curtain groups, and is fixedly connected to the ground or the filter body. The lifting mechanism is a power device for lifting and reciprocating the filter curtain groups, is composed of two parts: the driving mechanism and the pull rope assembly, and is mounted at the middle position above the crossbeam of the bearing frame. The two ends of the pull rope assembly respectively pass through two pulleys on the bearing frame and then are respectively connected with lifting lugs at center-of-gravity positions of the hanging beams of the two groups of filter curtains; and the driving mechanism drives the pull rope assembly to reciprocate, so that the pull rope pulls the two groups of filter curtains to reciprocate up and down, thereby driving the two groups of filter curtains to reciprocate up and down synchronously in opposite directions at the same speed.

In the above technical solution, each filter curtain comprises a hanging beam, a plurality of connecting blocks and a plurality of filter plates, wherein the hanging beam is a bearing structure of the whole filter curtain, and is usually made of section bars; and the lifting lug is arranged at the center-of-gravity position of each filter curtain on the hanging beam for connecting with the pull rope of the lifting mechanism. The upper end and the lower end of each connecting block are fixedly connected with the hanging beam and one filter plate respectively, so that the filter plates are suspended on the hanging beam one by one. The connecting blocks also have a plurality of specifications in length according to different liquid level heights of different contact reaction tanks; and the length difference between adjacent specifications is the liquid level difference between two adjacent contact reaction tanks. The filter plates are located at the bottom; all the filter plates are perpendicular to the hanging beam; and the center line of each filter plate coincides with the height center line of each connecting block. The two groups of filter curtains have the same structure and weight; the hanging beams on the two groups of filter curtains are respectively connected and fixed with the two ends of the pull ropes of the lifting mechanism and pulley block, and are pulled up by the pull ropes to be horizontally suspended above the two sides inside the biofilter: and the two groups of filter curtains are symmetrically and uniformly distributed in a staggered manner.

In the above technical solution, each filter plate is composed of two membranes and a frame, wherein the membrane is a carrier for microbial growth and is made of materials including but not limited to plastic plates, corrugated plates, geotextiles with two fabrics and one membrane, etc.; and the two membranes are tightly attached to both sides of the frame respectively and kept at tension. The frame has a C-shaped structure, and is prepared from materials including but not limited to section bars and hard plastics: and a slope is respectively arranged at an upper inner side and a lower inner side of the C shape, which can not only effectively ensure the stability and strength of the frame, but also facilitate the discharge of sludge between the two membranes and avoid the deposition of the sludge inside a filter piece. The membranes and the frame form a C-shaped rectangular structure with one side open; and the thickness of the frame determines the distance between the two membranes. To avoid blockage, the frame in the contact reaction tank near a sewage inlet is relatively thick so that the distance between the membranes is relatively large, greater than or equal to 3 cm; and the frame in the contact reaction tank near a sewage outlet is relatively thin so that the distance between the membranes is relatively small, less than or equal to 2 cm.

In the above technical solution, two groups of anti-swing guide rails respectively correspond to two groups of filter curtains, wherein each group of anti-swing guide rails is composed of two guide rails, which are respectively arranged at both ends of the biofilter and are parallel to each other. A connecting line of the two guide rails is located on the same plane with the up-and-down motion track of the hanging beam of each filter curtain; and guide rollers are mounted at both ends of the hanging beam and are respectively matched with the guide rails to guide and limit the filter curtain groups, thereby ensuring that the filter curtain groups always keep moving up and down perpendicularly in the whole motion process.

In the above technical solution, the driving mechanism comprises a motor and a speed reducer; the forward rotation, stop, backward rotation, stop, etc. of the motor and the speed reducer are performed in cycles, and is connected with the pull rope assembly and drive the pull rope assembly to reciprocate; and the pull rope assembly reciprocates to be connected with the two groups of filter curtains and drive the two groups of filter curtains to reciprocate up and down.

Further, in order to reduce the current impact of repeated start and stop of the motor, the driving mechanism is composed of a motor reducer, an output shaft of the driving mechanism, a driving gear, a driven gear, a driving sprocket, a forward rotating electromagnetic clutch and a backward rotating electromagnetic clutch. The motor reducer is a power source, wherein the output shaft of the motor reducer is fixedly connected with the driving gear and the driving sprocket; the driving gear is meshed with the driven gear; and the driving sprocket is connected with and drives the driven sprocket by a chain. The driven gear is fixedly connected with one end of the backward rotating electromagnetic clutch; and the other end of the backward rotating electromagnetic clutch is fixedly connected with the output shaft of the driving mechanism. The driven sprocket is fixedly connected with one end of the forward rotating electromagnetic clutch; and the other end of the forward rotating electromagnetic clutch is also fixedly connected with the output shaft of the driving mechanism. The output shaft of the driving mechanism pulls the two groups of filter curtains to reciprocate up and down through the pull rope assembly. When the forward rotating electromagnetic clutch is engaged with the driven sprocket, the output shaft is driven to rotate together by the driven sprocket, thereby realizing the forward rotation output of the output shaft. When the stroke reaches the end, the hanging beam on each filter curtain triggers a limiting sensor, so that the forward rotating electromagnetic clutch is separated from the driven sprocket, and the output shaft will stop rotating due to no power input. After a delay of T seconds, the backward rotating electromagnetic clutch is engaged with the driven gear; and the output shaft is driven to rotate together by the driven gear, thereby realizing the backward rotation output of the output shaft. When the stroke reaches the end, the hanging beam on each filter curtain triggers the limiting sensor; when the backward rotating electromagnetic clutch is separated from the driven gear, the power input will stop and the output shaft will stop rotating; and after a delay of T seconds, a new cycle will be restarted; the process is repeated in cycles; and thus, the driving assembly can realize free switching of the output of forward rotation, stop, backward rotation, stop, etc. in cycles without changing the operation of the motor reducer by periodically controlling the switching of the forward rotating electromagnetic clutch and the backward rotating electromagnetic clutch.

Further, for some large-scale sewage treatment systems, the number of biofilter curtains required is relatively large; the weight is relatively large; the hanging beam is relatively long; a plurality of bearing frames and pulley blocks are required to lift the filter curtain groups by the pull ropes; the added bearing frames and pulley blocks prevent the driving mechanism from bearing heavy weight, so that the bearing and the driving are separated. After adding the bearing frames and the pulley blocks, the driving mechanism in the lifting mechanism is mounted on the middle bearing frame; the pulley blocks are mounted on other bearing frames to share the weight of the filter curtains; and the two groups of filter curtains are lifted by the pull rope assemblies of the pulley blocks to keep horizontal lifting operation under the action of the driving mechanism.

In the above technical solution, a plurality of bearing frames and pulley blocks are added; the plurality of added bearing frames and pulley blocks lift the filter curtain groups through the pull ropes; the driving mechanism in the lifting mechanism is still mounted on the middle bearing frame; the plurality of added bearing frames and pulley blocks cross over two sides of the bio-membrane filter in rank, and are fixed on the ground or a bio-membrane filter body; the added pulley blocks are suspended on the added bearing frame, and are connected with the two groups of filter curtains and lift the two groups of filter curtains by the pull rope assembly, so that the two groups of filter curtains are lifted up by the pull rope and suspended above the two sides in the biofilter; and the driving mechanism drives the two groups of filter curtains to synchronously reciprocate up and down in opposite directions at the same speed.

The present invention has the remarkable effects as follows:

1. The treatment process and the device provided by the present invention have low operation energy consumption due to the organic matters in the sewage are decomposed aerobically by microorganisms, and the reaction tanks do not need aeration and sludge reflux.

2. The treatment process and the device provided by the present invention have no problem of sludge bulking in activated sludge, require no complicated mechanical device and high-difficulty operation technology, realize convenient management due to the concentration and the aeration amount of suspended solids in mixed liquor do not need to be adjusted.

3. The microorganisms are fixed on the filter curtains, and have strong adaptability to changes of BOD concentration and water quality.

4. The amount of sludge produced is only about half of that of the activated sludge process due to the long food chain of the microorganisms on the bio-membrane.

5. A secondary sedimentation tank does not need to be provided due to the sludge reflux is not required.

6. The length and the number of stages of the biofilter are not limited by the shaft length due to no costly long shaft with lathe-turning need is required.

7. The cost is lower due to the filter plate is a semi-closed rectangular structure with one side open, which is composed of a filter piece and a frame, the filter curtain is not circular, and the yield rate of the materials of the filter curtain is much higher than that of a circular filter curtain.

8. The filter piece is high in submerge rate and larger in effective treatment area due to the filter curtain can be completely submerged in the sewage.

9. The load for driving the two groups of filter curtains to lift is extremely low due to the weights of the two groups of filter curtains are exactly the same to form a balance in weight; and the operation energy consumption is equivalent to that of the RBC.

10. The structure is simpler and the cost is lower due to the bottom of the contact reaction tank does not need to be made into semicircle or polygon.

11. The diversion pipe of the RBC is not required, the water level difference of various stages is smaller, and the utilization rate of the tank depth of the contact reaction tank is higher due to the water inflowing and outflowing directions of the contact reaction tank is unlimited, and the effluent water of each stage is directly the influent water of the next stage.

12. The problem of gradual reduction of the treatment areas of the RBCs does not exist due to the submerge rates of the filter pieces at various stages are all 100% and the treatment capacities of the filter pieces at various stages are exactly the same.

Figure 1:
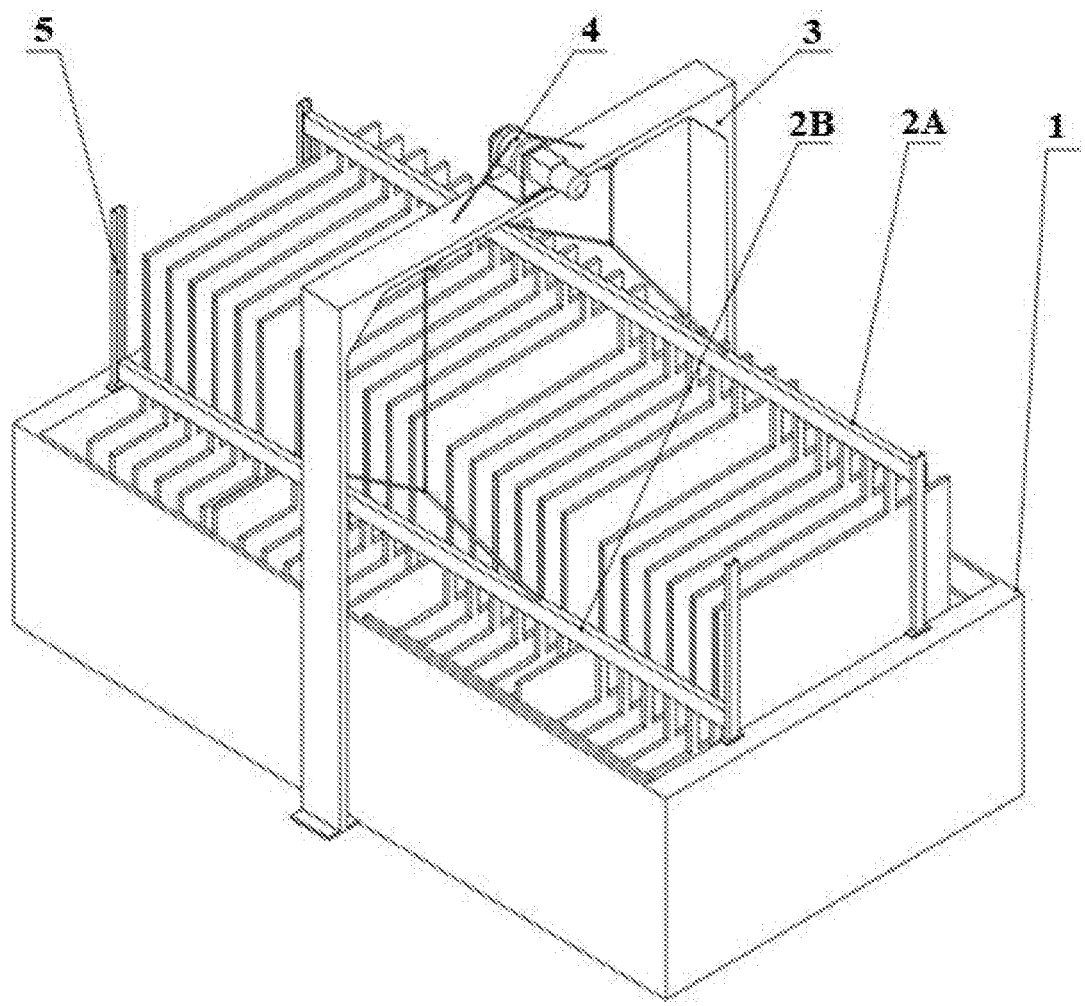
FIG. 1 is a stereogram of the structure of a submerged lifting circulation type bio-membrane filter.
Figure 2:
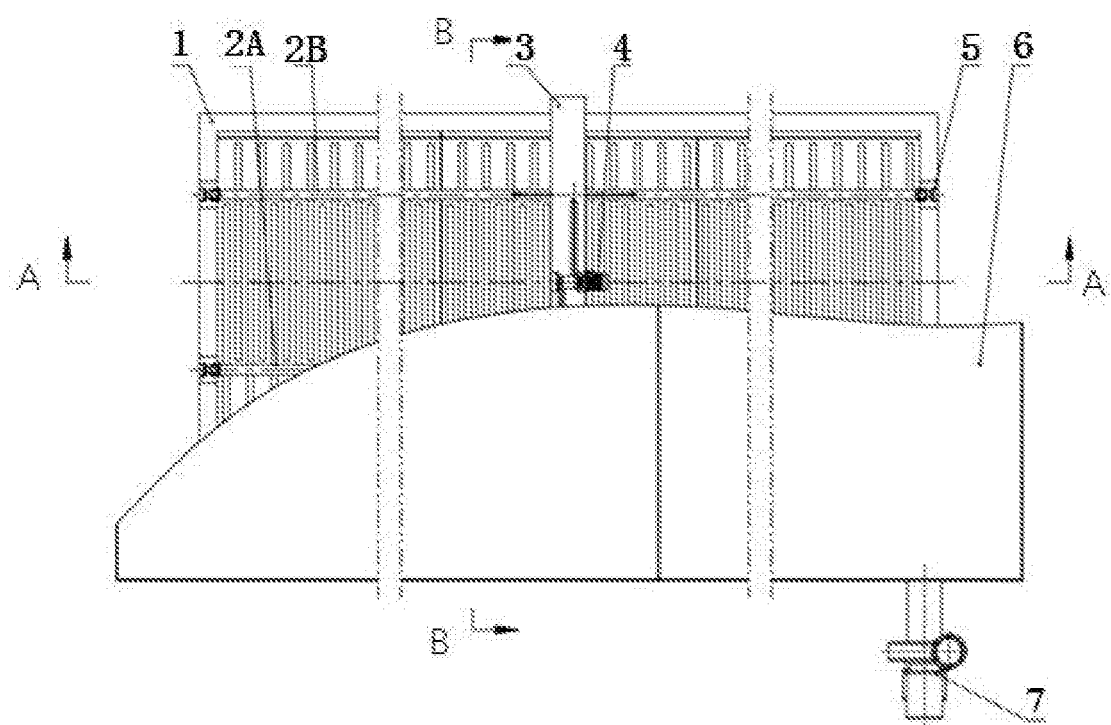
FIG. 2 is a top view of the structure of the submerged lifting circulation type bio-membrane filter.
Figure 3:
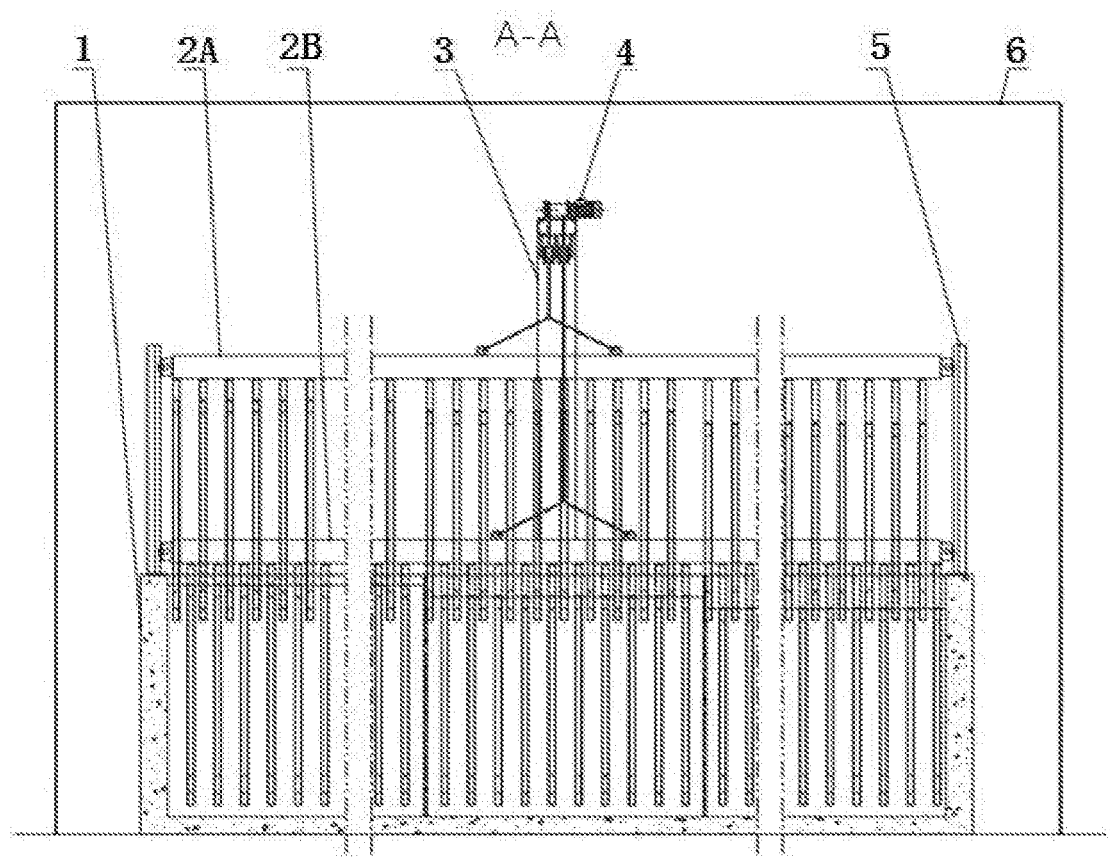
FIG. 3 is an A-A view of FIG. 2.
Figure 4:
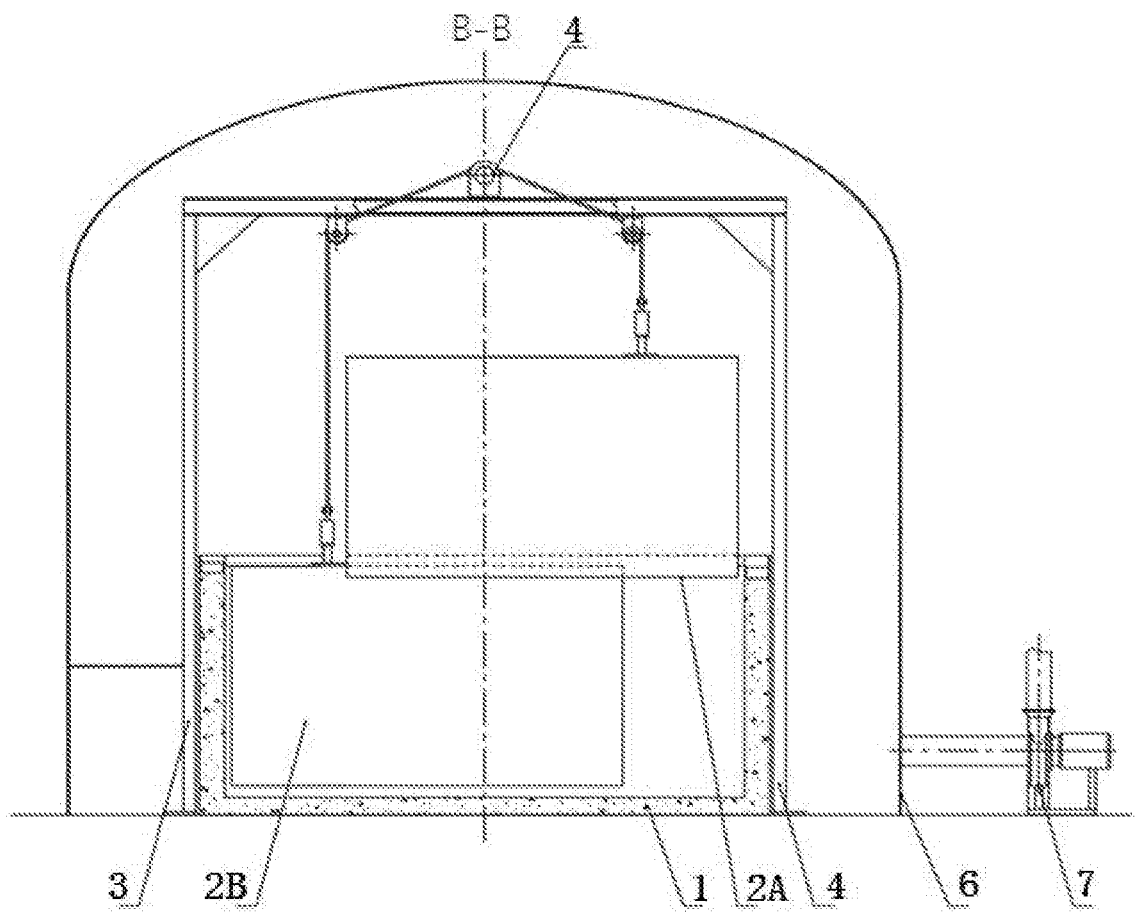
FIG. 4 is a B-B view of FIG. 2.

1—bio-membrane filter, 2A—filter curtain A, 2B—filter curtain B, 3—bearing frame, 4—lifting mechanism, 5—anti-swing guide rail, 6—thermal insulation shed, 7—induced draft fan, 8—liquid level line and 9—pulley block; 101—contact reaction tank; 101a—contact reaction tank a, 101b—contact reaction tank b, 101c—contact reaction tank c, 101s—contact reaction tank s, 102—water inlet tank, 103—water outlet tank, 104—sludge discharge pipe and 105—partition plate;

202—connecting block, 203—filter plate; 201—hanging beam, 202a—connecting block a, 202b—connecting block b, 202c—connecting block c, 202m—connecting block in, 203a—filter plate a, 203b—filter plate b, 203c—filter plate c, 203n—filter plate n and 204—guide roller; 2031—membrane and 2032—frame; 2031a—left membrane and 2031b—right membrane; 301—gantry, 9a—pulley a and 9b—pulley b; 401—driving mechanism; 402—pull rope assembly; 401a—motor reducer, 401b—output shaft of motor reducer, 401c1—driving gear, 401c2—driven gear, 401d1—driving sprocket, 401d2—driven sprocket, 401e—chain, 401f1—forward rotating electromagnetic clutch, 401f2—backward rotating electromagnetic clutch and 401g—output shaft of driving mechanism; and 3A—bearing frame A, 3B—bearing frame B and 3X—bearing frame X.

DETAILED DESCRIPTION OF PREFERRED EMBODIMENTS

Embodiment 1 (in Case of Single Bearing Frame)

A submerged lifting circulation type bio-membrane filter according to the present invention, having a structure as shown in FIGS. 1-4, is mainly composed of a biofilter 1, two groups of filter curtains 2A and 2B with equal weight, a bearing frame 3, a lifting mechanism 4, an anti-swing guide rail group 5, pulley blocks 9, etc. The biofilter 1 refers to multiple groups of rectangular containers located on or below the ground. The bearing frame 3 crosses over the biofilter 1 and coincides with the center-of-gravity planes of the filter curtains 2A and 2B, and is fixedly connected to the ground or a filter body of the biofilter 1. The pulley blocks 9 are suspended below a crossbeam of the bearing frame, and are respectively located at two sides. The lifting mechanism 4 is mounted at a middle position above the crossbeam of the bearing frame; and two ends of a pull rope of the lifting mechanism 4 respectively pass through the pulley blocks on both sides and are connected with the two groups of filter curtains 2A and 2B. The two groups of filter curtains 2A and 2B have the same structure and the same weight; hanging beams of the two groups of filter curtains 2A and 2B are respectively connected and fixed with the two ends of the pull rope of the lifting mechanism 4, and are pulled up and horizontally suspended above the two sides inside the biofilter; and the two groups of filter curtains 2A and 2B are symmetrically and uniformly distributed in a staggered manner. The two groups of filter curtains 2A and 2B are driven by the pull rope of the lifting mechanism 4 to lift up and down periodically, so that bio-membranes on the two groups of filter curtains 2A and 2B are in contact with the atmosphere and the sewage in turns, absorb organic matters in the sewage when lifting down for submerging, absorb oxygen when lifting up and exposing into the atmosphere, and bring oxygen into the sewage and cause sewage turbulence in a water tank when lifting down for submerging again, thereby uniformly distributing the dissolved oxygen. The anti-swing guide rails 5 are vertically mounted at both ends of the biofilter, and are respectively matched with the guide rollers at both ends of the hanging beams of the filter curtains 2A and 2B to play a role of guiding and limiting the filter curtain groups, thereby ensuring that the filter curtains always keep moving vertically up and down in the whole motion process.

A thermal insulation shed 6 can be arranged outside the bio-membrane filter according to actual needs, wherein a closed space is formed in the thermal insulation shed 6 to separate whole bio-membrane filter from the outside; an induced draft fan 7 is arranged outside the thermal insulation shed 6; a blast pipeline of the induced draft fan 7 is communicated with the interior of the thermal insulation shed 6; and an exhaust pipeline of the induced draft fan 7 is connected with deodorization equipment. The thermal insulation shed can insulate odor pollution while realizing thermal insulation, and can also control the oxygen supply by controlling the air volume of the induced draft fan.

Figure 5:
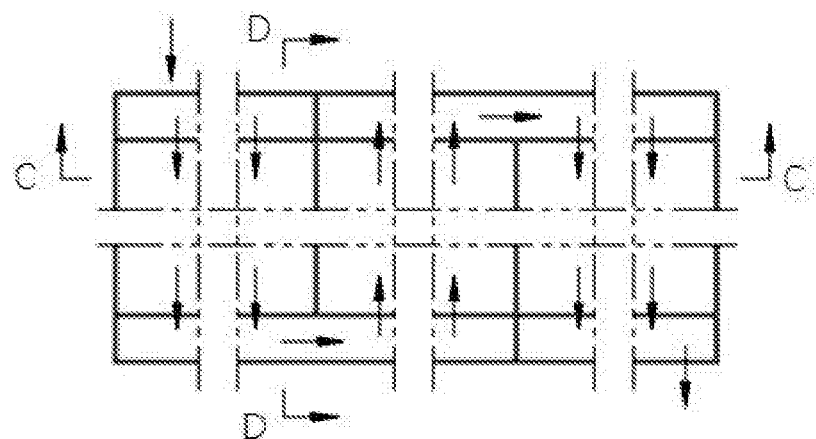
FIG. 5 is a top view of the structure of a bio-membrane filter.
Figure 6:
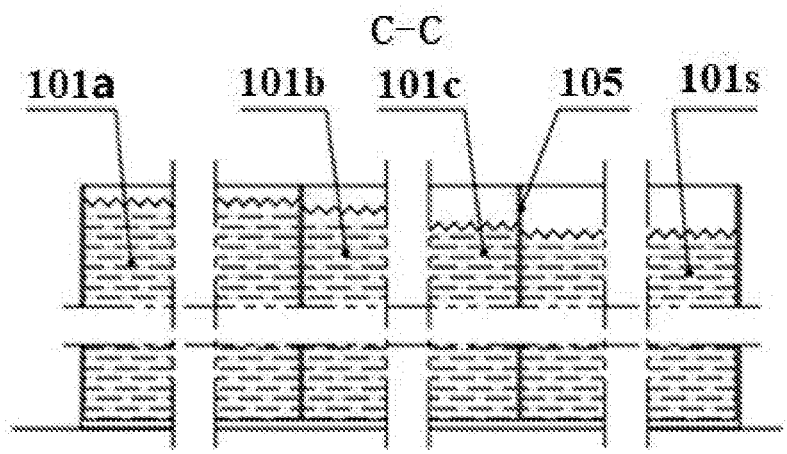
FIG. 6 is a C-C view of FIG. 5.
Figure 7:
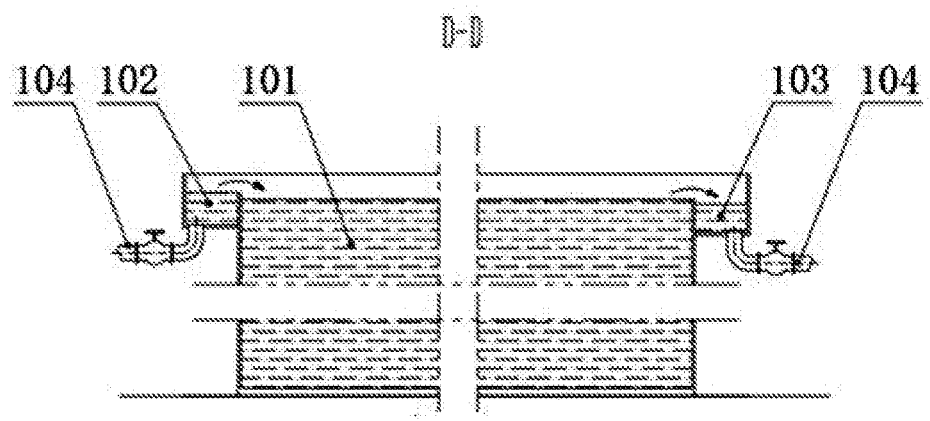
FIG. 7 is a D-D view of FIG. 5.

The bio-membrane filter 1 according to the present invention, having a structure as shown in FIGS. 5-7, is of a rectangular structure, and is generally prepared from materials including but not limited to concrete, steel, hard plastics, etc. A plurality of partition plates 105 are arranged in the bio-membrane filter, to divide the whole biofilter into a plurality of contact reaction tanks 101a, 101b, 101c, . . . and 101s along a length direction. The liquid level heights in the contact reaction tanks 101a, 101b, 101c, . . . and 101s lower in sequence; water inlet tanks 102 and water inlet tanks 103 of the contact reaction tanks 101a, 101b, . . . 101s are respectively arranged on both sides of the biofilter 1; the water outlet tank of the previous contact reaction tank 101a is located on the same side as the water inlet tank of the next contact reaction tank 101b and is communicated with each other; water enters from the water inlet tank of the first contact reaction tank 101a; supernatant of the water inlet tank 102 enters the contact reaction tanks 101a, 101b, 101c, . . . and 101s through overflow; and the supernatant of the contact reaction tanks 101a, 101b, 101c, . . . and 101s enters the water outlet tank through overflow, and finally is discharged from the water outlet tank of the last contact reaction tank 101s. The partition plate between each of the contact reaction tanks 101a, 101b, 101c, . . . and 101s and each of the water inlet tank 102 and the water outlet tank 103 are serrated, thereby better ensuring the smooth water flow and avoiding impact. A sludge discharge pipe 104 is arranged at the lowest position at the bottom of each of the water inlet tank 102 and the water outlet tank 103 for discharging the deposited sludge.

Figure 8:
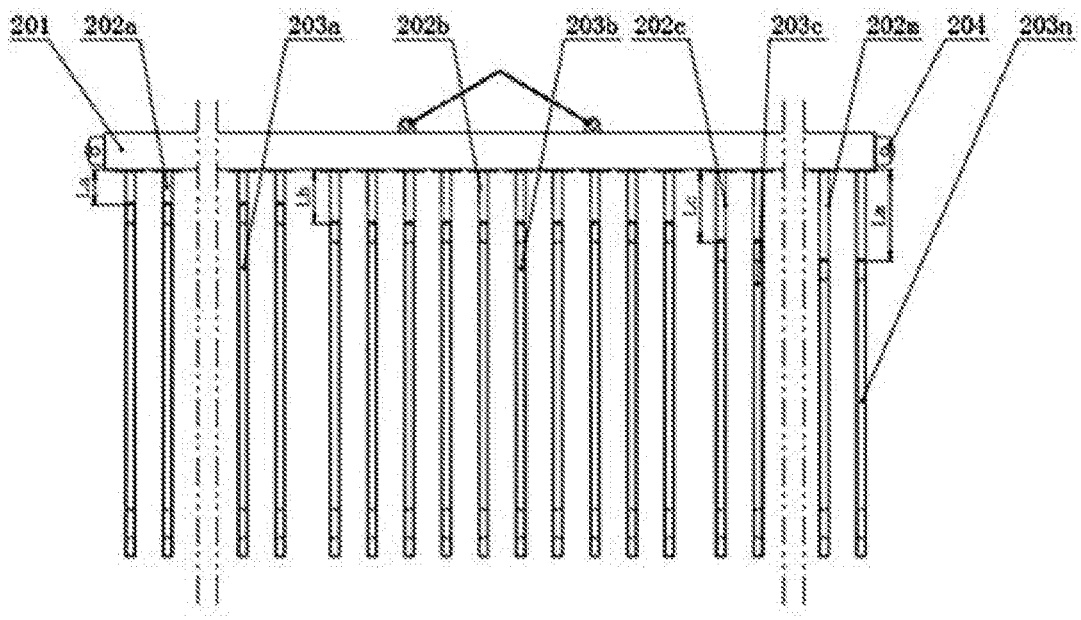
FIG. 8 is a schematic diagram of the structure of a filter curtain.
Figure 9:
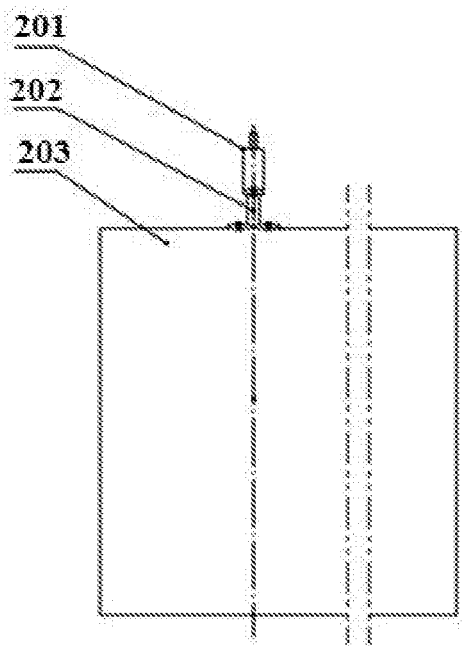
FIG. 9 is a side view of FIG. 8.
Figure 10:
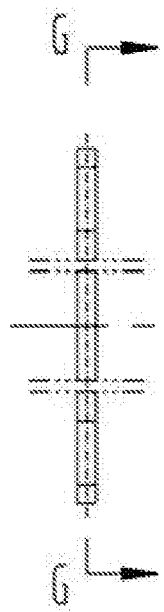
FIG. 10 is a schematic diagram of the structure of a filter plate.
Figure 11:
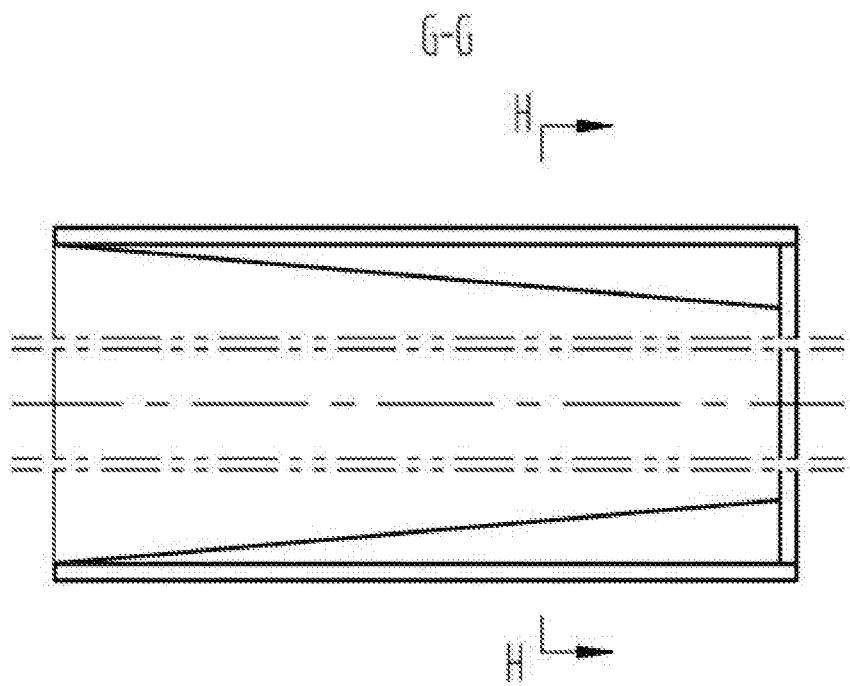
FIG. 11 is a G-G view of FIG. 10.
Figure 12:
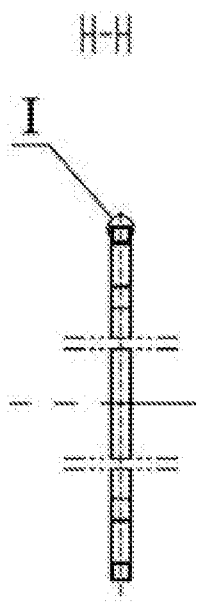
FIG. 12 is an enlarged view of a part I of FIG. 10.
Figure 13:
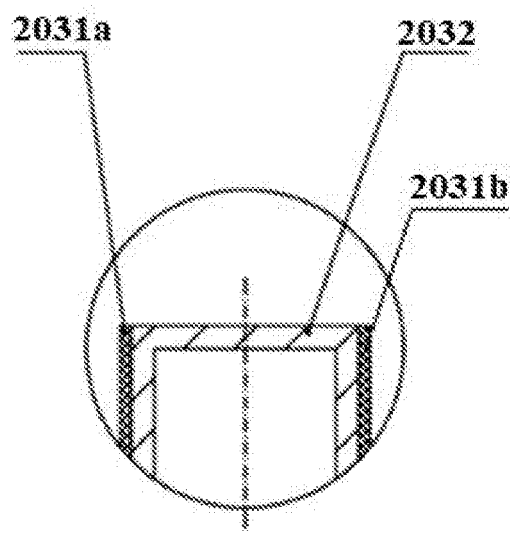
FIG. 13 is a schematic diagram of a relative position of the filter plate and the liquid level when the filter curtain is in an extreme position.

The filter curtains 2A and 2B according to the present invention, having a structure as shown in FIGS. 8 and 9, each is mainly composed of a hanging beam 201, a plurality of connecting blocks 202a, 202b, 202c, . . . and 202m, a plurality of filter plates 203a, 203b, 203c, . . . and 203n and guide rollers 204, wherein the number of the connecting blocks is the same as that of the filter plates. The hanging beam 201 is a bearing structure of the whole filter curtain, and is usually made of section bars; and lifting lugs are arranged on the hanging beams 201 for connecting with the pull rope of the lifting mechanism 4. An upper end and a lower end of each connecting block 202a, 202b, 202c, . . . or 202m are fixedly connected with the hanging beam 201 and one filter plate 203a, 203b, 203c, . . . or 203n respectively, so that the filter plates 203a, 203b, 203c, . . . and 203n are suspended on the hanging beam 201 one by one. The connecting blocks 203a, 203b, 203c, . . . and 203n also have a plurality of specifications in length according to different liquid level heights of different contact reaction tanks 101a, 101b, 101c, . . . and 101s; and the length difference between adjacent specifications is equal to the liquid level difference between two adjacent contact reaction tanks 101a, 101b, 101c, . . . and 101s. The filter plates 203a, 203b, 203c, . . . and 203n are located at the bottom of the filter curtains 2A and 2B. All the filter plates 203a, 203b, 203c, . . . and 203n are perpendicular to the hanging beam 201. A center-of-gravity line of each filter plate 203a, 203b, 203c, . . . or 203n coincides with a height center line of the connecting block 202a, 202b, 202c, . . . or 202m connected with each filter plate. Guide rollers are mounted and fixed at both ends of the hanging beam, and are respectively matched with the anti-swing guide rails 5 to play the roles of guiding and limiting the filter curtains 2A and 2B.

The filter plates 203a, 203b, 203c, . . . and 203n according to the present invention, having a structure as shown in FIGS. 10-13, each is composed of two membranes 2031a and 2031b and a frame 2032. The membranes 2031a and 2031b are working parts of the whole biofilter, are carriers for microbial growth, and are made of materials including but not limited to plastics, films, geotextiles, etc. The two membranes 2031a and 2031b are tightly attached to both sides of the frame 2032 respectively and kept at tension. The frame 2032 is has a C-shaped structure, and is prepared from materials including but not limited to the section bars and hard materials; a slope is respectively arranged at an upper inner side and a lower inner side of the C shape, which can not only effectively ensure the stability and strength of the structure, but also facilitate the discharge of sludge, thereby avoiding the deposition of the sludge inside the filter plates 203a, 203b, 203c, . . . and 203n. The two membranes 2031a and 2031b and the frame 2032 form a C-shaped rectangular structure with one side open. The thickness of the frame 2032 determines the distance between the two membranes 2031a and 2031b. To avoid blockage, the frame in the biofilter near a sewage inlet is relatively thick so that the distance between the membranes is relatively large (greater than or equal to 3 cm); and the frame in the biofilter near a sewage outlet is relatively thin so that the distance between the membranes is relatively small (less than or equal to 2 cm).

Figure 14:
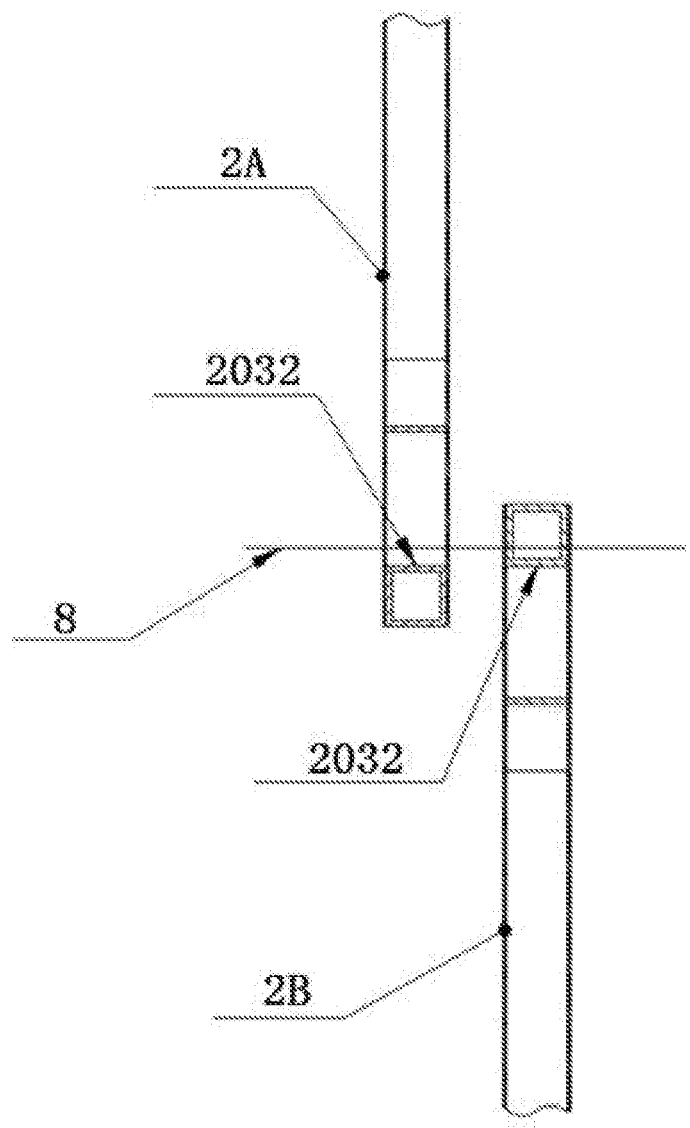
FIG. 14 is a schematic diagram of the structures of a bearing frame and a lifting mechanism.

As shown in FIG. 14, in the lifting process of the filter curtains 2A and 2B, an upper end face of a lower part of the frame 2032 should be lower than the liquid level in the contact reaction tank when the filter curtain 2A is lifted up to the highest position; and a lower end face of an upper part of the frame 2032 should be lower than the liquid level in the contact reaction tank when the filter curtain 2B is lifted down to the lowest position, so as to avoid excessive impact and disturbance of the liquid surface on the filter curtains. On the contrary, the lower end face of the upper part of the frame 2032 should be higher than the liquid level in the contact reaction tank when the curtain 2A is lifted down to the lowest position; and the upper end face of the lower part of the frame 2032 should be lower than the liquid level in the contact reaction tank when the filter curtain 2B is lifted up to the highest position.

Figure 15:
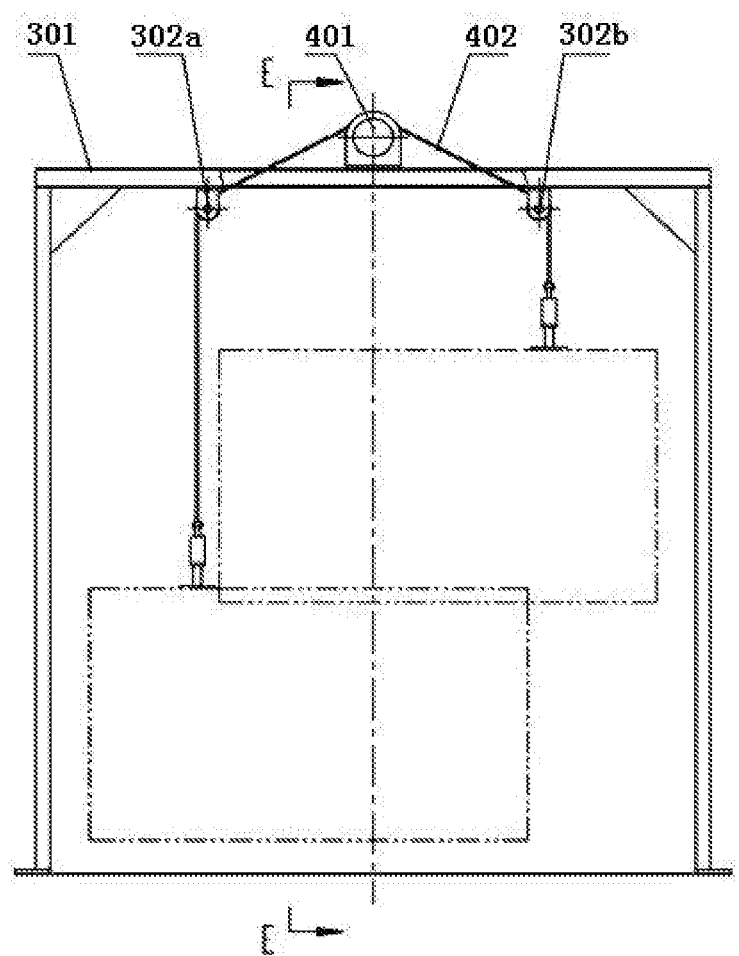
FIG. 15 is an E-E view of FIG. 15.
Figure 16:
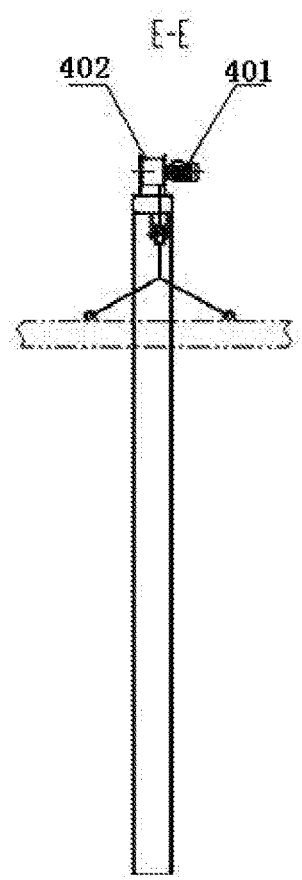
FIG. 16 is a schematic diagram of the structure of a driving assembly.

The bearing frame 3, the lifting mechanism 4 and the pulley block 9 according to the present invention have structures as shown in FIGS. 15 and 16. Two pulleys 9a and 9b of the pulley block 9 are respectively mounted on two sides below the crossbeam of a gantry 301. The lifting mechanism 4 is a power device for lifting and reciprocating the filter curtains 2A and 2B, and comprises two parts: a driving assembly 401 and a pull rope assembly 402. The driving assembly 401 and the pull rope assembly 402 are connected together and fixed in the middle of the crossbeam of the bearing frame 3. The two ends of the pull rope assembly 402 respectively pass through two pulleys 9a and 9b and are respectively connected with the lifting lugs at the center-of-gravity positions of the hanging beams 201 of the two groups of filter curtains 2A and 2B. The driving assembly 401 comprises two parts: a driving motor and a speed reducer; the cycles of forward rotation, stop, backward rotation, stop, etc. of the motor are controlled to drive the pull rope assembly to reciprocate; and the driving assembly 401 drives the two groups of filter curtains 2A and 2B to synchronously reciprocate up and down in opposite directions at the same speed.

Figure 17:
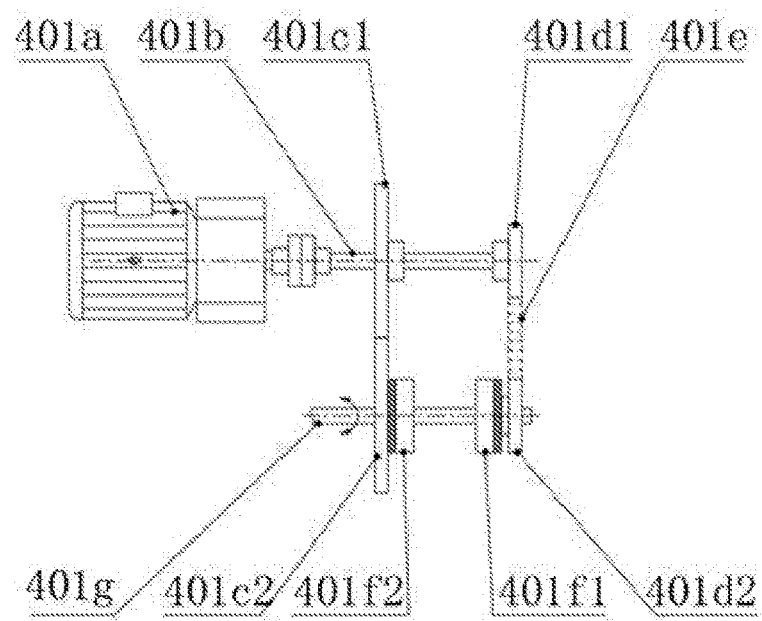
FIG. 17 is a stereogram of the structure of a bio-membrane filter with multiple bearing frames.

The driving assembly 401, having a structure as shown in FIG. 17, is composed of a motor reducer 401a, an output shaft 401b, a driving gear 401c1, a driven gear 401c2, a driving sprocket 401d1, a driven sprocket 401d2, a chain 401e, a forward rotating electromagnetic clutch 401f1, a backward rotating electromagnetic clutch 401f2 and an output shaft 401g. The motor reducer 401a is a power source, which drives the driving gear 401c1 and the driving sprocket 401d1 to rotate through the output shaft; and the driving gear 401c1 and the driving sprocket 401d1 rotate to respectively drive the driven gear 401c2 and the driven sprocket 401d2 to rotate. The forward rotating electromagnetic clutch 401f1 and the backward rotating electromagnetic clutch 401f2 are fixedly connected to the output shaft 401g respectively. When the forward rotating electromagnetic clutch 401f1 is engaged with the driven sprocket 401d2 toward the right, the driven sprocket 401d2 drives the output shaft 401g to rotate together, thereby realizing the forward rotation output of the output shaft 401g. When the forward rotating electromagnetic clutch 401f1 is disengaged from the driven sprocket 401d2 to the left and returns to the neutral position, the power input is stopped and the output shaft 401g will also stop rotating. When the backward rotating electromagnetic clutch 401f2 is engaged with the driven gear 401c2 toward the left, the driven gear 401c2 drives the output shaft 401g to rotate together, thereby realizing the backward rotation output of the output shaft 401g. When the backward rotating electromagnetic clutch 40112 is disengaged from the driven gear 401c2 to the right and returns to the neutral position, the power input is stopped and the output shaft 401g will also stop rotating. In this way, the driving assembly can realize free switching of the output of forward rotation, stop, backward rotation, stop, etc. in cycles without changing the operation of the motor reducer by periodically controlling the switching of the forward rotating electromagnetic clutch 401f1 and the backward rotating electromagnetic clutch 401f2.

Embodiment 2 (in Case of Multiple Bearing Frames)

Figure 18:
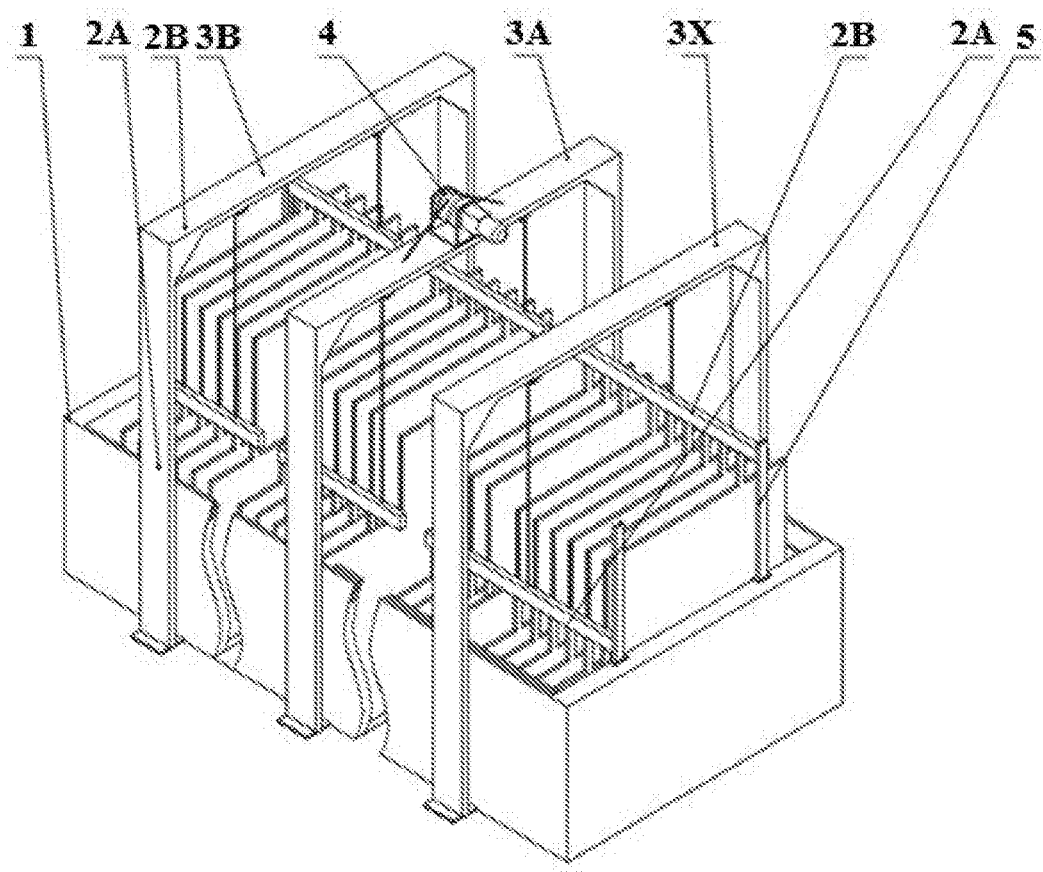
FIG. 18 shows a large biofilter which needs to adopt multiple bearing frames.

A large biofilter, which needs to adopt multiple bearing frames, according to the present invention has a structure as shown in FIG. 18, wherein a main structure of the large biofilter is the same as that of the biofilter with single bearing frame, except that a plurality of bearing frames 3D, . . . and 3x are added in the length direction of the biofilter 1, and the added bearing frames 3B, . . . and 3X are symmetrically distributed around the center of the middle bearing frame 3A. Each bearing frame 3A, 3B, . . . or 3X has the pull rope, which is connected with the lifting lugs on the hanging beam 201 of the filter curtains 2A and 2B to share the weight of the filter curtains 2A and 2B, so that the two groups of filter curtains are pulled up by the pull ropes and horizontally suspended above the two sides in the biofilter; and the driving mechanism drives the two groups of filter curtains to synchronously reciprocate up and down in opposite directions at the same speed.

We claim:
1. A device for the submerged lifting circulation biomembrane filter, comprising a biofilter, a bearing frame, two groups of filter curtains with equal weight, a lifting mechanism, a pulley block and two groups of anti-swing guide rails, wherein the lifting mechanism is mounted at a middle position above a crossbeam of the bearing frame; the bearing frame crosses over the biofilter and is fixed on the ground or a biofilter body; the pulley block is suspended on the crossbeam of the bearing frame; the lifting mechanism is connected with the two groups of filter curtains and drives the two groups of filter curtains by a driving mechanism in such a manner that a pull rope assembly passes through the pulley block; and the two groups of anti-swing guide rails are respectively arranged at positions corresponding to two ends of hanging beams of the two groups of filter curtains.

2. The device for the submerged lifting circulation bio-membrane filter according to claim 1, wherein the biofilter is of a rectangular structure and is located on or below the ground;
- the biofilter is divided into a plurality of contact reaction tanks by a plurality of partition plates;
- a water inlet tank and a water outlet tank of each contact reaction tank are respectively arranged on both sides of the biofilter and are perpendicular to the bearing frame;
- and the water outlet tank of the previous contact reaction tank is located on the same side as the water inlet tank of the next contact reaction tank and is communicated with each other;
- and a sludge discharge pipe is arranged at the lowest position at the bottom of each of the water inlet tank and the water outlet tank.

3. The device for the submerged lifting circulation bio-membrane filter according to claim 1, wherein the bearing frame is used for mounting the lifting mechanism and the pulley block, crosses over the biofilter, coincides with a center-of-gravity plane of the filter curtain groups, and is fixedly connected to the ground or the filter body;
- the lifting mechanism is a power device that generates power for lifting and reciprocating the filter curtain groups, is composed of two parts: the driving mechanism and the pull rope assembly, and is mounted at the middle position above the crossbeam of the bearing frame; the two ends of the pull rope assembly respectively pass through two pulleys on the bearing frame and then are respectively connected with lifting lugs at center-of-gravity positions of the hanging beams of the two groups of filter curtains; and the driving mechanism drives the pull rope assembly to reciprocate, so that the pull rope assembly pulls the two groups of filter curtains to reciprocate up and down, thereby driving the two groups of filter curtains to reciprocate up and down synchronously in opposite directions at the same speed.

4. The device for the submerged lifting circulation bio-membrane filter according to claim 1, wherein each filter curtain comprises a hanging beam, a plurality of connecting blocks and a plurality of filter plates; the lifting lug is arranged at the center-of-gravity position of each filter curtain on the hanging beam for connecting with the pull rope of the lifting mechanism; the upper end and the lower end of each connecting block are fixedly connected with the hanging beam and one filter plate respectively, so that the filter plates are suspended on the hanging beam one by one; the filter plates are located at the bottom; all the filter plates are perpendicular to the hanging beam; the center line of each filter plate coincides with the height center line of each connecting block; the two groups of filter curtains have the same structure and weight; the hanging beams on the two groups of filter curtains are respectively connected and fixed with the two ends of the pull ropes of the lifting mechanism and pulley block, and are pulled up by the pull ropes to be horizontally suspended above the two sides inside the biofilter.

5. The device for the submerged lifting circulation bio-membrane filter according to claim 4, wherein each filter plate comprises two membranes and a frame; the membrane is a carrier for microbial growth; the two membranes are tightly attached to both sides of the frame respectively and kept at tension; the frame has a C-shaped structure; the membranes and the frame form a C-shaped rectangular structure with one side open.

6. The device for the submerged lifting circulation bio-membrane filter according to claim 1, wherein the two groups of anti-swing guide rails respectively correspond to the two groups of filter curtains; each group of anti-swing guide rails is composed of two guide rails, which are respectively arranged at both ends of the biofilter and are parallel to each other; a connecting line of the two guide rails is located on the same plane with the up-and-down motion track of the hanging beam of each filter curtain; and guide rollers are mounted at both ends of the hanging beam and are respectively matched with the guide rails to guide the filter curtain groups.

7. The device for the submerged lifting circulation bio-membrane filter according to claim 3, wherein the driving mechanism comprises a motor and a speed reducer; the forward rotation, stop, backward rotation, stop of the motor and the speed reducer are performed in cycles, and is connected with the pull rope assembly and drive the pull rope assembly to reciprocate; and the pull rope assembly reciprocates to be connected with the two groups of filter curtains and to drive the two groups of filter curtains to reciprocate up and down.

8. The device for the submerged lifting circulation bio-membrane filter according to claim 1, wherein in the lifting process of the filter curtains, an upper end face of a lower part of a frame of one filter curtain is lower than the liquid level in the contact reaction tanks of the biofilter when the filter curtain is lifted up to the highest position;
- and a lower end face of an upper part of the frame of one filter curtain is higher than the liquid level in the contact reaction tanks of the biofilter when the filter curtain is lifted down to the lowest position, so as to avoid excessive impact and disturbance caused by a liquid surface on each filter curtain.

9. The device for the submerged lifting circulation bio-membrane filter according to claim 1, wherein a thermal insulation shed is arranged outside the bio-membrane filter;
- a closed space is formed in the thermal insulation shed to separate the whole bio-membrane filter from the outside;
- an induced draft fan is arranged outside the thermal insulation shed;
- a blast pipeline of the induced draft fan is communicated with the interior of the thermal insulation shed;
- an exhaust pipeline of the induced draft fan is connected with deodorization equipment;
- and the thermal insulation shed isolates odor pollution while realizing thermal insulation, and controls the oxygen supply by controlling the air volume of the induced draft fan.

* * * * *